United States Patent
Kim et al.

(10) Patent No.: US 12,002,949 B2
(45) Date of Patent: Jun. 4, 2024

(54) NEGATIVE ELECTRODE AND SECONDARY BATTERY INCLUDING THE SAME

(71) Applicant: LG CHEM, LTD., Seoul (KR)

(72) Inventors: Hyun-Min Kim, Daejeon (KR); Min-Kyung Kim, Daejeon (KR); Jong-Heon Seol, Daejeon (KR); Ki-Won Sung, Daejeon (KR); Myung-Ki Lee, Daejeon (KR); Eun-Ju Lee, Daejeon (KR); Young-Eun Choi, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 301 days.

(21) Appl. No.: 16/652,283

(22) PCT Filed: Nov. 30, 2018

(86) PCT No.: PCT/KR2018/015154
§ 371 (c)(1),
(2) Date: Mar. 30, 2020

(87) PCT Pub. No.: WO2019/108039
PCT Pub. Date: Jun. 6, 2019

(65) Prior Publication Data
US 2020/0243848 A1    Jul. 30, 2020

(30) Foreign Application Priority Data

Dec. 1, 2017    (KR) .................. 10-2017-0164373

(51) Int. Cl.
*H01M 4/36*    (2006.01)
*H01M 4/02*    (2006.01)
(Continued)

(52) U.S. Cl.
CPC ........... *H01M 4/366* (2013.01); *H01M 4/133* (2013.01); *H01M 4/134* (2013.01); *H01M 4/364* (2013.01);
(Continued)

(58) Field of Classification Search
CPC ........... H01M 2004/027; H01M 4/134; H01M 4/364; H01M 4/405; H01M 4/382;
(Continued)

(56) References Cited

U.S. PATENT DOCUMENTS

2005/0084759 A1    4/2005    Miyachi et al.
2009/0117468 A1    5/2009    Eom
(Continued)

FOREIGN PATENT DOCUMENTS

CN    1610816 A    4/2005
CN    103887507 A    6/2014
(Continued)

OTHER PUBLICATIONS

Machine Translation of Nobuyoshi (Year: 2016).*
(Continued)

*Primary Examiner* — Matthew T Martin
*Assistant Examiner* — Ankith R Sripathi
(74) *Attorney, Agent, or Firm* — Birch, Stewart, Kolasch & Birch, LLP (57) ABSTRACT

A negative electrode including: a current collector; a first negative electrode active material layer positioned on at least one surface of the current collector for a negative electrode and containing a first carbonaceous active material; and a second negative electrode active material layer positioned on a surface of the first negative electrode active material layer and containing a silicon-based active material
(Continued)

and carbon nanotubes. A lithium secondary battery including the negative electrode is also disclosed.

10 Claims, 3 Drawing Sheets

(51) Int. Cl.
  *H01M 4/133* (2010.01)
  *H01M 4/134* (2010.01)
  *H01M 4/38* (2006.01)
  *H01M 4/587* (2010.01)
  *H01M 4/62* (2006.01)
  *H01M 10/0525* (2010.01)

(52) U.S. Cl.
  CPC ........... *H01M 4/386* (2013.01); *H01M 4/587* (2013.01); *H01M 4/625* (2013.01); *H01M 10/0525* (2013.01); *H01M 2004/027* (2013.01)

(58) Field of Classification Search
  CPC ...... H01M 4/386; H01M 4/583; H01M 4/587; H01M 4/366; H01M 4/133; H01M 4/625
  See application file for complete search history.

(56) References Cited

U.S. PATENT DOCUMENTS

| | | | |
|---|---|---|---|
| 2012/0009472 A1* | 1/2012 | Yokoi | H01M 4/622 429/211 |
| 2014/0170484 A1 | 6/2014 | Fukahori | |
| 2014/0363736 A1 | 12/2014 | Kim et al. | |
| 2016/0268600 A1* | 9/2016 | Jeong | H01M 4/0471 |
| 2016/0336592 A1 | 11/2016 | Hirose et al. | |
| 2017/0033360 A1 | 2/2017 | Michaud et al. | |
| 2017/0207457 A1 | 7/2017 | Yue et al. | |
| 2018/0183051 A1* | 6/2018 | Tiquet | C09D 7/62 |
| 2019/0226120 A1* | 7/2019 | Duan | C25F 7/00 |
| 2020/0058941 A1* | 2/2020 | Hayashi | H01M 4/622 |
| 2020/0365899 A1* | 11/2020 | Tamai | H01M 4/386 |

FOREIGN PATENT DOCUMENTS

| | | | | |
|---|---|---|---|---|
| CN | 104603992 A | | 5/2015 | |
| CN | 105789556 A | | 7/2016 | |
| JP | 2001-283833 A | | 10/2001 | |
| JP | 2014-139914 A | | 7/2014 | |
| JP | 2015-524992 A | | 8/2015 | |
| JP | 2015-165482 A | | 9/2015 | |
| JP | 2017-513793 A | | 6/2017 | |
| JP | 2017-526118 A | | 9/2017 | |
| JP | JPWO-2018146865 A * | 8/2018 | ........ H01M 10/0525 |
| JP | JPWO-2018146865 A1 * | 8/2018 | ........ H01M 10/0525 |
| JP | JPWO2019044491 | * | 11/2021 | ........ H01M 10/0525 |
| KR | 10-2009-0045652 A | | 5/2009 | |
| KR | 10-2010-0138607 A | | 12/2010 | |
| KR | 10-2015-0014898 A | | 2/2015 | |
| KR | 20150014898 A * | 2/2015 | .......... H01M 10/052 |
| KR | 2015-0052004 A | | 5/2015 | |
| KR | 10-2016-0069458 A | | 6/2016 | |
| KR | 10-2016-0085998 A | | 7/2016 | |
| KR | 10-2017-0084798 A | | 7/2017 | |
| KR | 10-2017-0107213 A | | 9/2017 | |
| KR | 10-2017-0111746 A | | 10/2017 | |
| KR | 10-1802482 B1 | | 11/2017 | |

OTHER PUBLICATIONS

Machine Translation of IUCF-HYU (Year: 2015).*
Machine Translation of Takashi (Year: 2015).*
Machine Translation of IUCY-HYU (Year: 2015).*
Machine Translation of Takashi (Year: 2016).*
International Search Report (PCT/ISA/210) issued in PCT/KR2018/015154, dated Apr. 30, 2019.

* cited by examiner

FIG. 5

NEGATIVE ELECTRODE AND SECONDARY BATTERY INCLUDING THE SAME

TECHNICAL FIELD

The present disclosure relates to a negative electrode having improved life characteristics and a secondary battery including the same.

The present application claims priority to Korean Patent Application No. 10-2017-0164373 filed on Dec. 1, 2017 in the Republic of Korea, the disclosures of which are incorporated herein by reference.

BACKGROUND ART

As technological development and demand for mobile instruments have been increased, rechargeable secondary batteries which can be downsized and provided with high capacity are increasingly in demand. Among such secondary batteries, lithium secondary batteries having high energy density and voltage have been commercialized and used widely.

A lithium secondary battery has a structure in which a lithium salt-containing electrolyte is injected to an electrode assembly including a positive electrode and a negative electrode formed by applying each electrode active material onto an electrode current collector, and a porous separator interposed between both electrodes. Herein, each electrode is obtained by applying slurry including an active material, a binder and a conductive material to a current collector, followed by drying and pressing.

The fundamental characteristics, such as capacity, output and life, of a lithium secondary battery is significantly affected by the material for a negative electrode. To maximize the performance of a battery, it is required for the negative electrode active material to have an electrochemical reaction potential near the potential of lithium metal and high reversibility to the reaction with lithium ions and to show a high lithium ion diffusion rate in the active material.

A carbonaceous material used frequently as a material for forming a negative electrode for a lithium secondary battery has a limit theoretical capacity of 372 mAh/g which functions as an obstacle in a process for increasing energy density. To solve the problem, a silicon-based material has been considered as a substitute. Silicon has a theoretical capacity of 4010 mAh/g, which is at least 10 times higher than the theoretical capacity of the conventional carbonaceous material. However, a silicon-based material has a low charge/discharge efficiency of 80% which is lower than the charge/discharge efficiency (92%) of a carbonaceous material. In addition, a silicon-based material shows a change in volume of 300% or more during charge/discharge, and thus is problematic in that it cannot function as an active material due to a disconnection in a conductive path during continuous charge/discharge cycles.

DISCLOSURE

Technical Problem

The present disclosure is designed to solve the problems of the related art, and therefore the present disclosure is directed to providing a negative electrode for improving the life characteristics of a battery.

The present disclosure is also directed to providing a lithium secondary battery including the negative electrode.

Technical Solution

In one aspect of the present disclosure, there is provided a negative electrode including:

a current collector;

a first negative electrode active material layer positioned on at least one surface of the current collector wherein the first negative electrode active material layer comprises a first carbonaceous active material; and a second negative electrode active material layer positioned on a surface of the first negative electrode active material layer, wherein the second negative electrode active material layer comprises a silicon-based active material and carbon nanotubes.

The second negative electrode active material layer may further include a second carbonaceous active material.

The carbon nanotubes may be present in an amount of 0.1 wt % to 2 wt % based on a total weight of the first and second negative electrode active material layers.

The carbon nanotubes may be present in an amount of 1 part to 20 parts by weight based on 100 parts by weight of the silicon-based active material.

The carbon nanotubes may have an average diameter of 10 nm to 120 nm and an average length of 0.5 μm to 20 μm.

The carbon nanotubes may have a specific surface area of 100 $m^2$/g to 3,000 $m^2$/g.

The silicon-based active material may be present in an amount of 1 wt % to 30 wt % based on a total weight of the first and second negative electrode active material layers.

The first negative electrode active material layer and the second negative electrode active material layer may have a thickness ratio of 90:10 to 10:90.

In another aspect of the present disclosure, there is also provided a lithium secondary battery including the negative electrode.

Advantageous Effects

According to the present disclosure, carbon nanotubes as a conductive material are positioned on the surface of a silicon-based active material, and thus it is possible to solve the problem of isolation of a conductive path caused by a change in volume of the silicon-based active material. Particularly, since carbon nanotubes are used as a conductive material while a high-capacity silicon-based active material is separately incorporated to one layer of the negative electrode having a bilayer structure, it is possible to provide a negative electrode including carbon nanotubes distributed homogeneously on the surface of the silicon-based material. Thus, it is possible to control the position of the silicon-based active material and that of carbon nanotubes selectively, and thus to maximize the advantages of carbon nanotubes as a conductive material.

As a result, it is possible to inhibit generation of an electrically isolated silicon-based material in the lithium secondary battery according to an embodiment of the present disclosure, even after repeating charge/discharge cycles, and thus to inhibit degradation of discharge capacity and to improve cycle characteristics.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Unless otherwise stated, the expression 'one portion of layer, film, region, plate or the like is present "on" or "over" another portion' includes not only the expression 'one portion is present "directly on" another portion' but also the expression 'one portion is present on another portion with the other portion interposed between them'.

In one aspect of the present disclosure, there is provided a negative electrode including: a current collector for a negative electrode; a first negative electrode active material layer positioned on at least one surface of the current collector for a negative electrode and containing a carbonaceous active material; and a second negative electrode active material layer positioned on the first negative electrode active material layer and containing a silicon-based active material and carbon nanotubes.

According to an embodiment of the present disclosure, the negative electrode active material of the second negative electrode active material layer may include a silicon-based active material alone and the conductive material may include carbon nanotubes alone.

According to another embodiment of the present disclosure, the negative electrode active material of the second negative electrode active material layer may further include a carbonaceous active material in addition to the silicon-based active material. When the second negative electrode active material layer further includes a carbonaceous active material, the silicon-based active material and the carbonaceous active material may be used at a weight ratio of 1:99-99:1 or 10:90-60:40. When the content of the carbonaceous active material contained in the second negative electrode active material layer satisfies the above-defined range, the carbonaceous active material and pores of the electrode may alleviate a collapse of the structure of an electrode caused by the silicon-based active material. According to still another embodiment of the present disclosure, the conductive material may further include one or more additional conductive materials, such as carbon black, besides carbon nanotubes.

It has been required for a lithium ion secondary battery to be provided with high capacity more and more in order to increase the working time of a portable instrument. For example, a method for increasing the discharge capacity of a lithium ion secondary battery has been suggested by using a silicon (Si)-based active material or tin (Sn)-based active material capable of intercalation/deintercalation of a larger amount of lithium ions, as a negative electrode active material. However, since such a negative electrode active material causes a large change in volume caused by lithium ion intercalation/deintercalation, repetition of charge/discharge cycles causes a disconnection in the conductive network among negative electrode active material particles. As a result, a lithium ion secondary battery using a silicon-based material or tin-based active material shows poor cycle characteristics.

To solve the above-mentioned problem, the negative electrode according to the present disclosure has a bilayer structure which includes the first negative electrode active material layer containing a carbonaceous active material showing a small change in volume and having high charge/discharge efficiency, and the second negative electrode active material layer containing a silicon-based active material showing a large change in volume but realizing high capacity. Herein, to solve the problem of isolation of a conductive path caused by a change in volume of the silicon-based active material, carbon nanotubes (CNT) are used as a conductive material for the second negative electrode active material layer.

Carbon black which has been used widely as a conductive material to date has a spherical shape, aggregates to fill the pores of active material particles therewith and is present in the form of a bridge in a space between active material particles in a spot contact mode, thereby forming a conductive path. In the case of an active material, such as a carbonaceous active material, showing little change in volume, such a conductive path formed by the bridge in a spot contact mode is retained stably. Thus, such an active material can realize an excellent effect as a conductive material.

On the contrary, in the case of an active material, such as a silicon-based active material, showing a large change in volume, use of carbon black alone as a conductive material causes cracking in the particles due to excessive volumetric swelling of the silicon-based active material during repetition of charge/discharge cycles, and continuous alloy-forming reaction with lithium causes cracking and destruction to form new surfaces randomly. As a result, spherical aggregates of carbon black forming a conductive path in a simple spot contact mode in the silicon-based active material particles are separated and detached from the active material due to the cracking of the silicon-based active material. Thus, there is a problem in that contacts with the other electrode materials, including the current collector and silicon-based active material, positioned in the surroundings of the electrode may be disconnected with ease.

To solve the above-mentioned problem, there has been an attempt to apply fibrous carbon nanotubes having a desired length instead of a spherical conductive material, such as carbon black.

Figure 1:
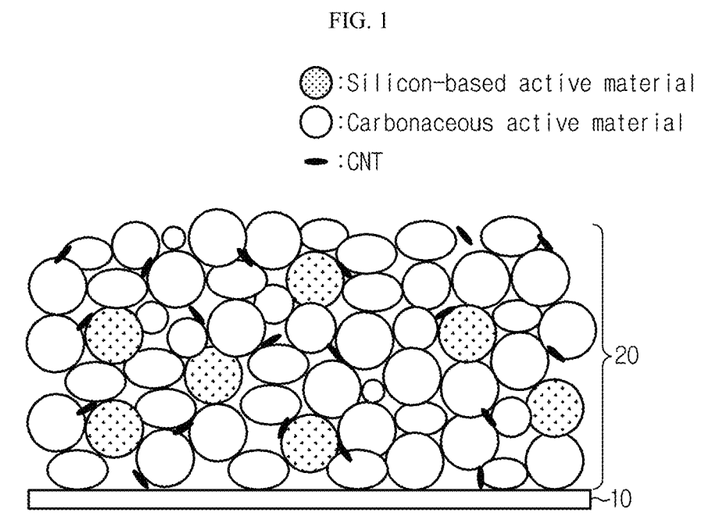
FIG. 1 is a sectional view illustrating a conventional negative electrode.

Referring to FIG. 1, the negative electrode according to the related art includes a current collector 10 and a negative electrode active material layer 20. Herein, the negative electrode active material layer 20 includes, as an active material, a carbonaceous active material in combination with a silicon-based active material, and uses carbon nanotubes as a conductive material. However, carbon nanotubes have higher affinity to the carbon-based active material as compared to the silicon-based active material. Thus, carbon nanotubes are not in sufficient contact with the silicon-based active material. As a result, when the silicon-based active material undergoes excessive volumetric swelling and causes cracking in the particles during charge/discharge cycles, carbon nanotubes cannot ensure sufficient contact sites with the silicon-based active material, and cannot form a conductive path sufficiently.

Figure 2:
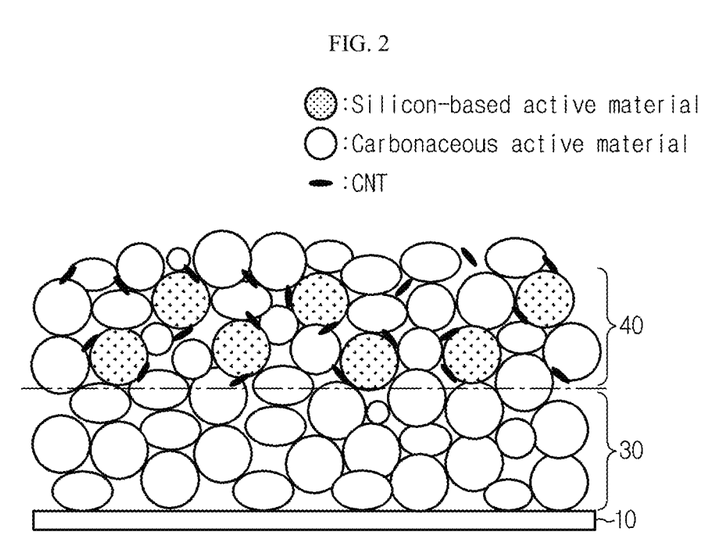
FIG. 2 is a sectional view illustrating the negative electrode according to an embodiment of the present disclosure.
Figure 3:
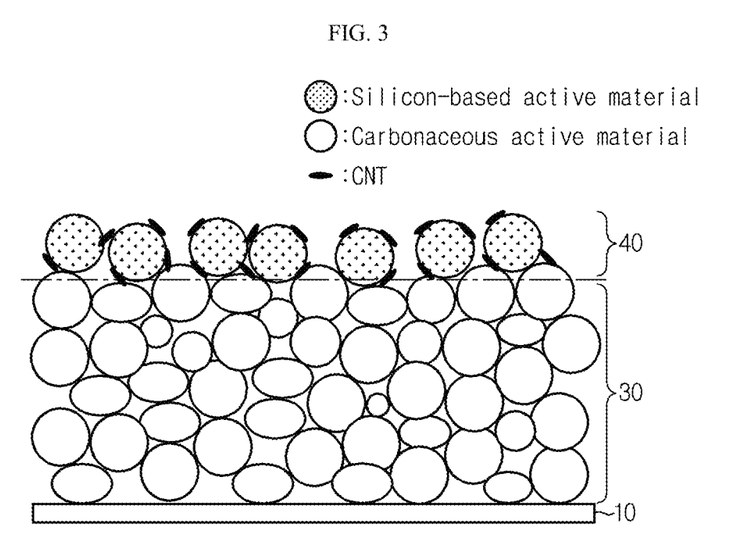
FIG. 3 is a sectional view illustrating the negative electrode according to another embodiment of the present disclosure.

Meanwhile, referring to FIG. 2 and FIG. 3, the negative electrode according to an embodiment of the present disclosure includes a current collector 10, a first negative electrode active material layer 30 positioned on the current collector 10, and a second negative electrode active material layer 40 positioned on the first negative electrode active material layer 30. Herein, the position of carbon nanotubes used as a conductive material is limited to the second negative electrode active material layer containing a silicon-based active material. Then, this allows carbon nanotubes to be in contact with the silicon-based active material to a higher degree.

In other words, carbon nanotubes contained in the second negative electrode active material layer according to the present disclosure are positioned sufficiently throughout the surface of the silicon-based active material in a line contact mode, not a spot contact mode, with the silicon-based active material, thereby forming a conductive path. As a result, even when the silicon-based active material undergoes volumetric swelling during charge/discharge cycles to cause cracking of particles, the fibrous phase of carbon nanotubes is positioned on the surface of silicon-based particles so that it may still cover the whole of the cracked or shrunk silicon-based particles and crosslink the particles. Thus, the conductive path formed by carbon nanotubes can be retained stably. Therefore, the lithium secondary battery according to an embodiment of the present disclosure inhibits generation of an electrically isolated silicon-based material even when repeating charge/discharge cycles. As a result, it is possible to inhibit degradation of discharge capacity and to improve cycle characteristics.

Particularly, referring to FIG. 3, the second negative electrode active material layer 40 according to an embodiment of the present disclosure may include a silicon-based active material alone as an active material, and may further include carbon nanotubes as a conductive material. In this case, carbon nanotubes may be in contact with the silicon-based active material to the highest degree. Thus, it is possible to inhibit generation of an electrically isolated silicon-based material even when repeating charge/discharge cycles, and thus to further improve cycle characteristics.

The carbon nanotubes may be at least one selected from the group consisting of single walled carbon nanotubes, multi walled carbon nanotubes and carbon nanofibers, but are not limited thereto.

The single walled carbon nanotube refers to a carbon nanotube having one wall (graphite surface) in one tubular carbon nanotube through the interconnection of hexagons formed by binding of six carbon atoms. Such a single walled carbon nanotube shows excellent electrical properties derived from a one-dimensional structure and provides various electrical properties depending on the chiral structure and diameter of a hexagonal honeycomb-shaped molecule. A multi walled carbon nanotube refers to a carbon nanotube having a plurality of walls. Carbon nanofibers refer to a microfiber-shaped carbonaceous material having a diameter of several tens to several hundreds of nanometers.

The carbon nanotubes may have a linear shape and an aspect ratio of 40-6,000. When the aspect ratio satisfies the above-defined range, it is possible to realize the properties (e.g. electrical conductivity) unique to carbon nanotubes and the carbon nanotubes can be applied more homogeneously to the electrode current collector during the manufacture of the electrode.

The carbon nanotubes may have a length of 0.5-20 µm, particularly 1-10 µm, and an average diameter of 10-120 nm, particularly 20-100 nm.

When the average diameter of carbon nanotubes satisfies the above-defined range, it is possible to retain the conductivity between silicon-based materials and to improve cycle characteristics of a lithium secondary battery.

Particularly, when the average diameter of carbon nanotubes satisfies the above-defined range, the number of carbon nanotubes contained in the negative electrode active material layer is controlled suitably. Thus, it is possible to prevent a side reaction with lithium ions, to improve the initial efficiency, to prevent degradation of the binding ability of the negative electrode active material layer, to allow carbon nanotubes to be deformed flexibly during the shrinking of the silicon-based material, to retain conductivity between silicon-based materials, and to improve cycle characteristics of a lithium secondary battery. Herein, 'initial efficiency' refers to the value obtained by dividing the discharge capacity at the first charge/discharge by the charge capacity at the first charge/discharge. A higher initial efficiency value is preferred.

When the average length of carbon nanotubes satisfies the above-defined range, carbon nanotubes efficiently form crosslinking between the silicon-based materials or between the silicon-based material and the current collector, during the shrinking of the silicon-based material. Thus, it is possible to retain conductivity and to improve cycle characteristics of a lithium secondary battery.

Herein, 'average diameter of carbon nanotubes' means an arithmetic mean of fiber diameters (outer diameters) of carbon nanotubes, and 'average length of carbon nanotubes' means an arithmetic mean of fiber lengths of carbon nanotubes. For example, the average diameter and average length may be obtained through an image observed by a scanning electron microscope (SEM). In other words, the average diameter and average length of carbon nanotubes may be obtained by extracting several samples from an SEM image of carbon nanotubes, measuring the diameter and length of each sample, and calculating an arithmetic mean.

In addition, carbon nanotubes may have a specific surface area of 100-3,000 $m^2/g$, 100-1,000 $m^2/g$, or 120-800 $m^2/g$. When the specific surface area of carbon nanotubes satisfies the above-defined range, carbon nanotubes efficiently form crosslinking between the silicon-based materials or between the silicon-based material and the current collector, during the shrinking of the silicon-based material. Thus, it is possible to retain conductivity and to improve cycle characteristics of a lithium secondary battery.

Carbon nanotubes may be used in an amount of 0.1-2 wt %, particularly 0.2-1 wt %, based on the total weight of the negative electrode active material layer.

In addition, carbon nanotubes may be used in an amount of 1-20 parts by weight, or 2-15 parts by weight, based on 100 parts by weight of the silicon-based active material.

When the content of carbon nanotubes satisfies the above-defined range, it is possible to retain conductivity between the silicon-based active materials during the shrinking of the silicon-based active material and to improve the binding ability of the negative electrode active material. Thus, it is possible to improve cycle characteristics of a lithium secondary battery.

Particularly, the silicon-based material may include Si, Si alloy, Si oxide (e.g. $SiO_2$, $SiO_x$ (1<x<2), or the like), or a combination thereof. For example, Si alloy may include a Si phase, and a phase of intermetallic compound of Si with at least one of the other metal elements. The Si phase allows reversible lithium ion intercalation/deintercalation, and is a phase capable of lithium ion intercalation/deintercalation. In addition, the phase of intermetallic compound of Si with the other element (Si-containing intermetallic compound phase) is in close contact with the Si phase, and is a phase capable of retaining Si against a change in volume of the Si phase.

Particular examples of the element forming an intermetallic compound with Si may be at least one selected from alkaline earth metal elements and transition metal elements capable of forming a stable intermetallic compound with Si. The element forming an intermetallic compound with Si may include at least one selected from Mg, Ti, V, Cr, Mn, Co, Cu, Fe and Ni.

For example, the silicon-based material, such as Si alloy, may be obtained by pulverizing an amorphous Si compound formed by an atomizing method, roll quenching method or rotary electrode method through a jet mill or ball mill. In addition, the silicon-based material may be obtained by pulverizing powder of Si simple substance and powder of the other compound, mixing them, and carrying out mechanical alloying treatment.

The silicon-based material may have an average particle diameter of 0.5-5 μm. When the average particle diameter of silicon-based material satisfies the above-defined range, the binding ability of the negative electrode active material is improved and carbon nanotubes sufficiently forms a conductive network between the silicon-based materials. Thus, it is possible to further improve cycle characteristics of a lithium secondary battery. Herein, 'average particle diameter of silicon-based material' means an arithmetic mean of diameters of silicon-based materials, when the silicon-based materials are regarded as spheres. For example, the average particle diameter of silicon-based material may be determined by a particle size distribution analyzer using laser diffraction scattering.

According to an embodiment of the present disclosure, the carbonaceous active material in the first negative electrode active material layer may include a carbonaceous material capable of lithium ion intercalation/deintercalation, and particular examples thereof include graphite, such as natural graphite or artificial graphite; carbon black, such as carbon black, acetylene black, ketjen black, channel black, furnace black, lamp black or thermal black; or the like.

Particularly, the carbonaceous active material may be natural graphite, artificial graphite or a combination of natural graphite with artificial graphite.

In general, artificial graphite is prepared by carbonizing a raw material, such as coal tar, coal tar pitch or petroleum-based heavy oil, at 2,500° C. or higher. After the graphitization, artificial graphite is controlled in particle size through pulverization, formation of secondary particles, or the like, and then is used as a negative electrode active material. In the case of artificial graphite, crystals thereof are distributed randomly in the particles. In addition, artificial graphite has lower spheroidicity as compared to natural graphite and shows a slightly sharp shape.

Artificial graphite that may be used according to an embodiment of the present disclosure includes commercially available mesophase carbon microbeads (MCMB), mesophase pitch-based carbon fibers (MPCF), block-like graphitized artificial graphite, powder-like graphitized artificial graphite, or the like. Such artificial graphite has a spheroidicity of 0.91 or less, preferably 0.6-0.91, and more preferably 0.7-0.9.

In addition, artificial graphite may have a particle diameter of 5-30 μm, preferably 10-25 μm.

Natural graphite is generally present in the form of a sheet-like aggregate before it is processed. Sheet-like particles are converted into spherical shapes having a smooth surface through post-treatment processes, such as particle pulverization and reassemblage steps, so that they may be used as an active material for manufacturing an electrode.

Natural graphite used according to an embodiment of the present disclosure preferably has a spheroidicity larger than 0.91 and equal to or less than 0.97, 0.93-0.97, or 0.94-0.96.

In addition, natural graphite may have a particle diameter of 5-30 μm, or 10-25 μm.

When the carbonaceous active material is a combination of artificial graphite with natural graphite, the weight ratio of artificial graphite and natural graphite may be 9.99:0.01-0.01:9.99, or 9.7:0.3-7:3. When the weight ratio satisfies the above-defined range, it is possible to realize high output.

According to an embodiment of the present disclosure, the thickness of the negative electrode active material layer having a bilayer structure is not particularly limited. For example, the negative electrode active material layer may have a thickness of 40-300 μm, wherein each of the first active material layer and the second active material layer may have a thickness of 8-240 μm.

The thickness ratio of the first negative electrode active material layer and the second negative electrode active material layer may be 90:10-10:90, 90:10-30:70, or 90:10-50:50. When the thickness ratio satisfies the above-defined range, the first negative electrode active material layer, the second negative electrode active material layer and the current collector are bound well to form a conductive path, even when the second negative electrode active material layer has a different swelling/shrinking ratio, and output characteristics, capacity and cycle characteristics may be improved.

The negative electrode according to an embodiment of the present disclosure may be obtained by a wet process including dispersing the active material, binder and the conductive material into a dispersion medium and coating the current collector with the resultant dispersion, or a dry process including directly mixing the active material, binder and the conductive material in a powder state without using any dispersion medium, optionally carrying out pulverization, and coating the current collector with the resultant mixture.

For example, in the case of a wet process, the first negative electrode active material, binder and optionally a thickening agent are dispersed into a dispersion medium to prepare the first negative electrode slurry, and the slurry is applied onto at least one surface of a negative electrode current collector, followed by drying and pressing. Then, the second negative electrode active material, binder and optionally a thickening agent are dispersed into a dispersion medium to prepare the second negative electrode slurry, and the slurry is applied onto the first negative electrode slurry, followed by drying and pressing.

In the method according to an embodiment of the present disclosure, the negative electrode current collector used as a substrate for forming an active material layer is not particularly limited, as long as it has conductivity while not causing any chemical change in the corresponding battery. Particular examples of the negative electrode current collector include copper, stainless steel, aluminum, nickel, titanium, baked carbon, copper or stainless steel surface-treated with carbon, nickel, titanium, silver, or the like, aluminum-cadmium alloy, or the like.

Although there is no particular limitation in the thickness of the current collector, the current collector may have a thickness of 3-500 μm.

According to an embodiment of the present disclosure, the step of forming the first negative electrode active material layer and the step of forming the second negative electrode active material layer may be carried out sequentially or at the same time.

In other words, the step of forming the first negative electrode active material layer and the second negative electrode active material layer may include a step of applying the first negative electrode slurry onto at least one surface of the negative electrode current collector, applying the second negative electrode slurry onto the applied first negative electrode slurry, and carrying out drying. In a variant, the step of forming the first negative electrode active material layer and the second negative electrode active material layer may include applying the first negative electrode slurry onto at least one surface of the negative electrode current collector, while applying the second negative electrode slurry onto the applied first negative electrode slurry at the same time, and carrying out drying.

Particularly, the first negative electrode slurry may be coated on the current collector first and then dried. After that, the second negative electrode slurry may be coated and dried thereon to form the first negative electrode active material layer and the second negative electrode active material layer sequentially. Otherwise, the two types of slurry may be coated and dried at the same time by using a double slot die, or the like, thereby forming the first/second negative electrode active materials at once.

There is no particular limitation in the coating process, as long as it is a method used currently in the art. For example, a coating process using a slot die may be used, or a Mayer bar coating process, gravure coating process, dip coating process, spray coating process, etc. may be used.

As the binder, various types of binder polymers may be used and particular examples thereof include polyvinylidene-co-hexafluoropropylene (PVDF-co-HFP), polyvinylidene fluoride, polyacrylonitrile, polymethyl methacrylate, polyvinyl alcohol, carboxymethyl cellulose (CMC), starch, hydroxypropyl cellulose, regenerated cellulose, polyvinyl pyrrolidone, polytetrafluoroethylene, polyethylene, polypropylene, polyacrylate, styrene butadiene rubber (SBR), fluoro-rubber, various copolymers, or the like.

The solvent that may be used includes N-methyl pyrrolidone, acetone, water, or the like.

In addition, the thickening agent used optionally according to the present disclosure may include carboxymethyl cellulose (CMC), carboxyethyl cellulose, polyvinyl pyrrolidone, or the like.

The first negative electrode active material and the second negative electrode active material obtained by coating and drying each slurry may be pressed, wherein the pressing may be carried out by a process, such as roll pressing, used currently in the art. For example, the pressing may be carried out at a pressure of 1-20 MPa and a temperature of 15-30° C.

According to an embodiment of the present disclosure, the first negative electrode active material layer and the second negative electrode active material layer may be pressed at the same time, i.e., at once. Otherwise, after the first negative electrode active material layer is formed and pressed first, the second negative electrode slurry may be applied thereon, dried and pressed.

Particularly, when forming a multi-layer type active material layer, the first negative electrode slurry may be coated, dried and pressed first to form the first negative electrode active material layer, and then the second negative electrode slurry may be coated thereon, dried and pressed to form an active material layer having a bilayer structure so that each layer may be subjected to a separate pressing step. Otherwise, after the first negative electrode slurry and the second negative electrode slurry may be coated and dried at the same time or sequentially, and then pressing may be carried out only once.

In another aspect of the present disclosure, there is provided a lithium secondary battery including the negative electrode obtained as described above. Particularly, the lithium secondary battery may be obtained by injecting a lithium salt-containing electrolyte to an electrode assembly including a positive electrode, the above-described negative electrode and a separator interposed between both electrodes.

The positive electrode may be obtained by mixing a positive electrode active material, a conductive material, a binder and a solvent to prepare slurry, and directly coating the slurry onto a metal current collector, or casting the slurry onto a separate support and laminating a positive electrode active material film peeled from the support on a metal current collector.

The active material used for the positive electrode may be any one type of active material particles selected from the group consisting of $LiCoO_2$, $LiNiO_2$, $LiMn_2O_4$, $LiCoPO_4$, $LiFePO_4$ and $LiNi_{1-x-y-z}Co_xM1_yM2_zO_2$ (wherein each of M1 and M2 independently represents any one selected from the group consisting of Al, Ni, Co, Fe, Mn, V, Cr, Ti, W, Ta, Mg and Mo, and each of x, y and z independently represents the atomic proportion of an element forming oxide, wherein $0 \le x < 0.5$, $0 \le y < 0.5$, $0 \le z < 0.5$ and $0 < x+y+z \le 1$), and combinations thereof.

Meanwhile, the same conductive material, binder and solvent as those used for manufacturing the negative electrode may be used.

The separator may be a conventional porous polymer film used currently as a separator, and particular examples thereof include a porous polymer film made of a polyolefinic polymer, such as ethylene homopolymer, propylene homopolymer, ethylene-butene copolymer, ethylene/hexene copolymer or ethylene/methacrylate copolymer. Such porous polymer films may be used alone or in the form of a laminate. In addition, an insulating thin film having high ion permeability and mechanical strength may be used. The separator may include a safety reinforced separator (SRS) including a ceramic material coated on the surface of the separator to a small thickness. In addition, a conventional porous non-woven web, such as non-woven web made of high-melting point glass fibers or polyethylene terephthalate fibers, may be used, but the scope of the present disclosure is not limited thereto.

The electrolyte includes a lithium salt as an electrolyte and an organic solvent for dissolving the electrolyte.

There is no particular limitation in the lithium salt, as long as it is used currently for an electrolyte for a secondary battery. For example, the anion of lithium salt may be any one selected from the group consisting of $F^-$, $Cl^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$.

Any conventional organic solvent may be used as the organic solvent contained in the electrolyte with no particular limitation. Typical examples of the organic solvent include at least one selected from the group consisting of propylene carbonate, ethylene carbonate, diethyl carbonate, dimethyl carbonate, ethyl methyl carbonate, methyl propyl carbonate, dipropyl carbonate, dimethyl sulfoxide, acetonitrile, dimethoxy ethane, diethoxy ethane, vinylene carbonate, sulforane, γ-butyrolactone, propylene sulfite and tetrahydrofuran.

Particularly, ethylene carbonate and propylene carbonate, which are cyclic carbonates among the carbonate organic solvents, have a high dielectric constant and dissociate the lithium salt in an electrolyte well. In addition, it is possible to prepare an electrolyte having high electrical conductivity more preferably, when using such cyclic carbonates in combination with low-viscosity low-dielectric constant linear carbonates, such as dimethyl carbonate and diethyl carbonate, at an adequate ratio.

Optionally, the electrolyte used according to the present disclosure may further include an additive, such as an overcharge-preventing agent, contained in the conventional electrolyte.

The lithium secondary battery according to an embodiment of the present disclosure may be obtained by interposing the separator between the positive electrode and the negative electrode to form an electrode assembly, introducing the electrode assembly to a pouch, cylindrical battery casing or a prismatic battery casing, and then injecting the electrolyte thereto to finish a secondary battery. Otherwise, the lithium secondary battery may be obtained by stacking the electrode assemblies, impregnating the stack with the electrolyte, and introducing the resultant product to a battery casing, followed by sealing.

According to an embodiment of the present disclosure, the lithium secondary battery may be a stacked, wound, stacked and folded or a cable type battery.

The lithium secondary battery according to the present disclosure may be used for a battery cell used as a power source for a compact device, and may be used preferably as a unit battery for a medium- or large-size battery module including a plurality of battery cells. Particular examples of such medium- or large-size devices include electric vehicles, hybrid electric vehicles, plug-in hybrid electric vehicles, power storage systems, or the like. Particularly, the lithium secondary battery may be useful for batteries for hybrid electric vehicles and new & renewable energy storage batteries, requiring high output.

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Example 1

<Manufacture of Negative Electrode>

Artificial graphite as a carbonaceous active material, a binder polymer (styrene-butadiene rubber (SBR) and carboxymethyl cellulose (CMC)), and carbon black as a conductive material were mixed at a weight ratio of 95:3.5:1.5.

The resultant mixture was mixed with water as a dispersion medium at a weight ratio of 1:2 to prepare slurry for the first active material layer. The carbon nanotubes (CNT) had a specific surface area of 500 m²/g. The carbon nanotubes (CNT) were multi walled carbon nanotubes. Herein, the binder polymer includes styrene-butadiene rubber (SBR) and carboxymethyl cellulose (CMC) at a weight ratio of 2.3:1.2.

As a silicon-based active material, silicon oxide (SiO) having a Coulombic efficiency of 80% or more under the condition of charge/discharge at 0.1 C was prepared. Slurry for the second active material layer was prepared in the same manner as slurry for the first active material layer, except that the carbonaceous active material was mixed with the silicon-based active material at a weight ratio of 9:1 and a mixture containing carbon black and carbon nanotubes at a ratio of 1:0.5 was used as a conductive material. In other words, the active material, binder polymer, carbon black and carbon nanotubes (CNT) were used at a weight ratio of 95:3.5:1.0:0.5, wherein the carbonaceous active material and the silicon-based active material were used at a weight ratio of 9:1 in the active material.

A double slot die was used to coat one surface of copper (Cu) film as a negative electrode current collector having a thickness of 10 μm with the slurry for the first active material layer. Then, the slurry for the second active material layer was applied onto the slurry for the first active material layer and dried under vacuum at 130° C. for 1 hour to form the first active material layer and the second active material layer.

The formed first active material layer and second active material layer were pressed through roll pressing at the same time to obtain a negative electrode including an active material layer having a bilayer structure and a thickness of 80 μm. Herein, the thickness ratio of the first active material layer and the second active material layer was 1:1. The negative electrode active material layer had a loading amount of 17 mg/cm² on the dry weight basis.

<Manufacture of Positive Electrode>

$Li(Ni_{0.8}Mn_{0.1}Co_{0.1})O_2$(NCM-811) as a positive electrode active material, carbon black as a conductive material and polyvinylidene fluoride (PVdF) as a binder were added to N-methyl pyrrolidone (NMP) as a solvent at a weight ratio of 96:2:2 to prepare slurry for a positive electrode active material. The slurry was coated onto one surface of an aluminum current collector having a thickness of 15 μm and drying and pressing were carried out under the same conditions as the negative electrode to obtain a positive electrode. Herein, the positive electrode active material layer had a loading amount of 20 mg/cm² on the dry weight basis.

<Manufacture of Lithium Secondary Battery>

$LiPF_6$ was dissolved in a mixed organic solvent containing ethylene carbonate (EC), propylene carbonate (PC) and ethylmethyl carbonate (EMC) at a ratio of 3:1:6 (volume ratio) to a concentration of 1.0M to prepare a non-aqueous electrolyte.

A polyolefin separator was interposed between the positive electrode and the negative electrode, and then the electrolyte was injected thereto to obtain a lithium secondary battery.

Example 2

<Manufacture of Negative Electrode>

A negative electrode having a thickness of 80 μm was obtained in the same manner as described in Example 1, except that the slurry for the second active material layer was prepared by using 1 part by weight of carbon black and 0.3 parts by weight of carbon nanotubes (CNT) as a conductive material. In other words, the active material, binder polymer, carbon black and carbon nanotubes (CNT) were used at a weight ratio of 95:3.5:1.2:0.3, wherein the weight ratio of the carbonaceous active material and the silicon-based active material was 9:1 in the active material.

<Manufacture of Lithium Secondary Battery>

A lithium secondary battery was obtained in the same manner as described in Example 1, except that the negative electrode obtained as described above was used.

Comparative Example 1

<Manufacture of Negative Electrode>

A negative electrode active material (mixed active material including artificial graphite as a carbonaceous active material and silicon oxide (SiO) as a silicon-based active material), a binder polymer (styrene-butadiene rubber (SBR)), and carbon black and carbon nanotubes (CNT) as a conductive material were mixed at a weight ratio of 95:3.5:1:0.5 to provide a mixture. The resultant mixture was mixed with water as a dispersion medium at a weight ratio of 1:2 to prepare slurry for the active material layer. Herein, the weight ratio of the artificial graphite as a carbonaceous active material and the silicon oxide (SiO) as a silicon-based active material was 95:5.

A slot die was used to coat one surface of copper (Cu) film as a negative electrode current collector having a thickness of 10 μm with the slurry for the active material layer. Then, the slurry was dried at 100° C. for 3 minutes to form the active material layer.

The formed active material layer was pressed through roll pressing to obtain a negative electrode including an active material layer having a thickness of 80 μm.

<Manufacture of Lithium Secondary Battery>

A lithium secondary battery was obtained in the same manner as described in Example 1, except that the negative electrode obtained as described above was used.

Comparative Example 2

<Manufacture of Negative Electrode>

A negative electrode was obtained in the same manner as described in Comparative Example 1, except that 1.5 parts by weight of carbon black was used alone as a conductive material.

<Manufacture of Lithium Secondary Battery>

A lithium secondary battery was obtained in the same manner as described in Example 1, except that the negative electrode obtained as described above was used.

Observation of Surface of Silicon-Based Active Material

In each of the negative electrodes according to Example 1 and Comparative Example 1, the surface of the silicon-based active material was observed with a scanning electron microscope (SEM). The results are shown in FIG. 4 and FIG. 5.

Figure 4:
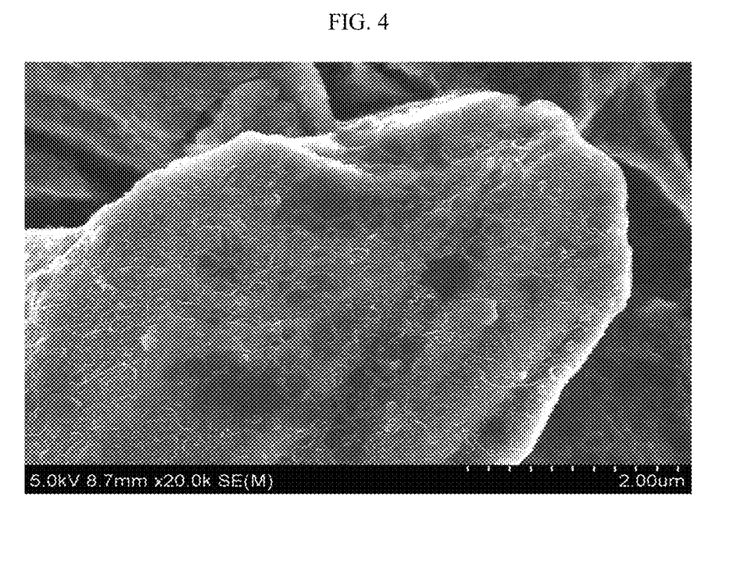
FIG. 4 is a scanning electron microscopic (SEM) image illustrating the surface of the negative electrode according to Example 1.
Figure 5:
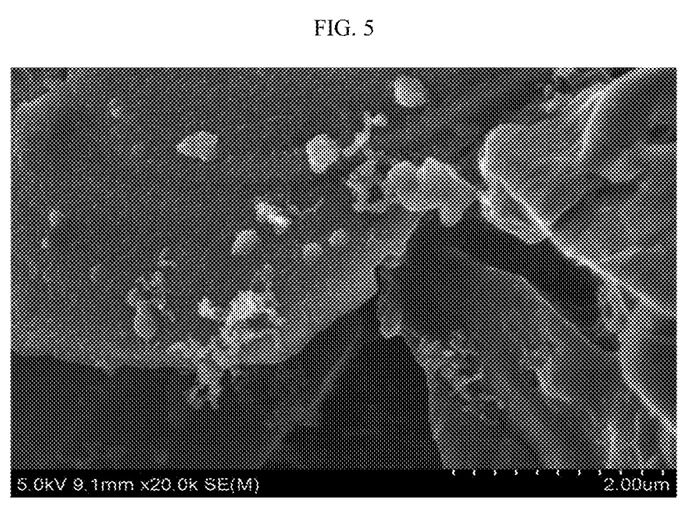
FIG. 5 is a scanning electron microscopic (SEM) image illustrating the surface of the negative electrode according to Comparative Example 1.

Referring to FIG. 4, carbon nanotubes as a conductive material is observed with ease on the surface of the silicon-based active material. However, in FIG. 5, it is difficult to observe the shape of carbon nanotubes as a conductive material on the surface of the silicon-based active material. Thus, according to Example 1, it is possible to provide a negative electrode including carbon nanotubes distributed homogeneously on the surface of the silicon-based active material by using carbon nanotubes as a conductive material, while incorporating a high-capacity silicon-based active material separately to an individual layer of the negative electrode having a bilayer structure.

Evaluation of Capacity Maintenance

Each of the secondary batteries according to Examples 1 and 2 and Comparative Examples 1 and 2 was charged to 4.0 V at 25° C. and ⅓ C and discharged to 3.0 V under a constant current condition of ⅓ C. Such charge/discharge cycles were repeated 10 times and 100 times, and the discharge capacity was determined after 1 cycle, after 10 cycles and after 100 cycles. Then, capacity maintenance was determined according to the following Formula 1 and Formula 2. The results are shown in the following Table 1.

Capacity maintenance (%) after 10 cycles={Discharge capacity after 10 cycles/Discharge capacity after 1 cycle}×100  Formula 1:

Capacity maintenance (%) after 100 cycles={Discharge capacity after 100 cycles/Discharge capacity after 1 cycle}×100  Formula 2:

TABLE 1

|  | Change in capacity after 10 cycles Capacity maintenance (%) | Change in capacity after 100 cycles Capacity maintenance (%) |
| --- | --- | --- |
| Comp. Ex. 1 | 98.95 | 93.94 |
| Comp. Ex. 2 | 95.91 | 91.35 |
| Ex. 1 | 99.12 | 94.10 |
| Ex. 2 | 99.06 | 93.53 |

Referring to Table 1, Examples 1 and 2 show a smaller decrease in capacity maintenance at the initial 10$^{th}$ cycle as compared to Comparative Examples 1 and 2. It is thought that the conventional silicon-based active material tends to show significant degradation of capacity during the initial stage of cycles, but the negative electrode active material according to the present disclosure includes the silicon-based active material merely in a specific layer of multiple negative electrode active material layers while using carbon nanotubes as a conductive material, and thus can improve the problem of degradation of capacity during the initial stage of cycles. In addition, even after 100 cycles, Examples 1 and 2 shows a higher capacity maintenance as compared to Comparative Examples 1 and 2.

What is claimed is:

1. A negative electrode comprising:
   a current collector;
   a first negative electrode active material layer positioned on at least one surface of the current collector, wherein the first negative electrode active material layer comprises a first carbonaceous active material; and
   a second negative electrode active material layer positioned on a surface of the first negative electrode active material layer, wherein the second negative electrode active material layer comprises a silicon-based active material and carbon nanotubes,
   wherein the carbon nanotubes are positioned in a line contact mode and distributed homogeneously only on the surface of the silicon-based active material, and
   wherein the second negative electrode active material layer further comprises a second carbonaceous active material.

2. The negative electrode according to claim 1, wherein the carbon nanotubes are present in an amount of 0.1 wt % to 2 wt % based on a total weight of the first and second negative electrode active material layers.

3. The negative electrode according to claim 1, wherein the carbon nanotubes are present in an amount of 1 part to 20 parts by weight based on 100 parts by weight of the silicon-based active material.

4. The negative electrode according to claim 1, wherein the carbon nanotubes have an average diameter of 10 nm to 120 nm and an average length of 0.5 μm to 20 μm.

5. The negative electrode according to claim 1, wherein the carbon nanotubes have a specific surface area of 100 $m^2/g$ to 3,000 $m^2/g$.

6. The negative electrode according to claim 1, wherein the silicon-based active material is present in an amount of 1 wt % to 30 wt % based on a total weight of the first and second negative electrode active material layers.

7. The negative electrode according to claim 1, wherein the first negative electrode active material layer and the second negative electrode active material layer have a thickness ratio of 90:10 to 10:90.

8. A lithium secondary battery comprising the negative electrode as defined in claim 1.

9. The negative electrode according to claim 1, wherein the silicon-based active material consists of SiO particles.

10. A negative electrode comprising:
a current collector;
a first negative electrode active material layer positioned on at least one surface of the current collector, wherein the first negative electrode active material layer comprises a first carbonaceous active material; and
a second negative electrode active material layer positioned on a surface of the first negative electrode active material layer, wherein the second negative electrode active material layer comprises a silicon-based active material and carbon nanotubes,
wherein the carbon nanotubes are positioned in a line contact mode and distributed homogeneously only on the surface of the silicon-based active material.

* * * * *